United States Patent [19]

Baginski et al.

[11] Patent Number: 4,884,047

[45] Date of Patent: Nov. 28, 1989

[54] HIGH RATING MULTIPOLE CIRCUIT BREAKER FORMED BY TWO ADJOINED MOLDED CASES

[75] Inventors: Pierre Baginski, Grenoble; Jean-Pierre Nebon, St. Martin Le Vinoux; Marc Bur, Grenoble, all of France

[73] Assignee: Merlin Gerin, France

[21] Appl. No.: 279,457

[22] Filed: Dec. 5, 1988

[30] Foreign Application Priority Data

Dec. 10, 1987 [FR] France ................................ 87 17447

[51] Int. Cl.⁴ .......................................... H01M 75/00
[52] U.S. Cl. ..................................... 335/10; 361/331; 361/353
[58] Field of Search ............... 361/331, 347, 350, 351, 361/353, 354, 355, 360, 361, 363, 376, 396; 335/8–10, 120, 132

[56] References Cited

U.S. PATENT DOCUMENTS 3,289,049 11/1966 Middendorf ........................ 361/376
4,197,519 4/1980 Grenier .
4,764,650 8/1988 Bur et al. ........................ 200/144 C

FOREIGN PATENT DOCUMENTS 0090176 10/1983 European Pat. Off. .
0180537 5/1985 European Pat. Off. .
1181770 10/1969 Fed. Rep. of Germany .

Primary Examiner—H. Broome
Assistant Examiner—L. Dovovan
Attorney, Agent, or Firm—Arnold, White & Durkee

[57] ABSTRACT

The circuit breaker is formed by two adjoined standard multipole molded cases, resin being cold-cast between the opposite side walls, comprising reliefs, of the two cases in order to provide fixing. A spacer, secured by bolts to the side walls of the two cases, defines their distance apart and can be used to cooperate with a racking cam when the circuit breaker is drawn into a fixed frame. The circuit breaker comprises an electronic trip device, an operating mechanism and an operating bar of the poles common to all the poles. At least two adjacent poles are twinned, that is to say eletrically connected in parallel.

5 Claims, 9 Drawing Sheets

HIGH RATING MULTIPOLE CIRCUIT BREAKER FORMED BY TWO ADJOINED MOLDED CASES

BACKGROUND OF THE INVENTION

The invention relates to a low-voltage multipole circuit breaker, for high current intensities, comprising a plurality of poles juxtaposed inside an insulating molded case whose side walls comprise reliefs, each pole comprising a pair of separable contacts, an arc chute and a pair of contact terminal pads connected to the separable contacts and protruding outwards from the case, the contact terminal pads being connected to connecting strips designed to be connected respectively to the phases of a mains system to be protected.

The rating of a circuit breaker of this type is, for a case of a predetermined size, determined by the choice of poles, that is to say essentially by the dimensions of the copper parts associated with the pole.

SUMMARY OF THE INVENTION

The object of the invention is to extend a range of circuit breakers so as to form, from a standard molded case, a circuit breaker with a higher rating than that of the individual standard poles which make it up, this object having to be accomplished with a minimum number of modifications.

The circuit breaker according to the invention is characterized in that it is formed by two adjoined standard multipole cases, comprising in common an operating bar of the poles, an operating mechanism of said bar, and an electronic trip device actuating said mechanism, a spacer being fixed to the opposite side walls of the two cases, resin cold-cast between said opposite side walls providing fixing of the two cases, and at least one of the connecting strips being connected to at least two adjacent twinned poles, electrically arranged in parallel.

By adjoining two standard three-pole cases, it is thus possible, by twinning the poles two by two, to double the circuit breaker rating in comparison with that of the individual poles that make it up.

The invention is particularly advantageous for high-rating circuit breakers, produced in small quantities, and for which it would not be profitable to design a special case with dimensions specially adapted to the rating.

The width of a circuit breaker obtained by adjoining two standard multipole molded cases can reach one meter. It is therefore particularly important for the link between the cases to be solid.

Due to the presence of marked reliefs on the side walls of the standard cases, a purely mechanical link, by means of a bolted wedge for instance, would require complex machining. However using cold-cast resin which follows the exact shape of the walls and smooths out any irregularities, according to the invention, takes advantage on the other hand of the existence of these reliefs and enables satisfactory fixing of the cases to be achieved at a reasonable cost.

According to a preferred embodiment, each standard case is formed by assembly of an intermediate case, a rear case and a cover, the front face of the intermediate case dividing the case into a front compartment bounded by said face and the cover, and a rear compartment designed to house the poles, and the spacer is fixed to the bottom part of the opposite side walls of the intermediate cases of the two standard cases to be adjoined, the resin filling the space remaining between the two intermediate cases, the common electronic trip device and bar operating mechanism being housed in the front compartment of one of the standard cases.

The circuit breaker being of the draw-in type in a fixed frame comprising a rotating shaft securedly united to at least two lateral racking cams designed to drive the circuit breaker in the course of racking-in, the spacer comprises a roller designed to cooperate, when the circuit breaker is drawn into the frame, with a central racking cam securedly fixed to said shaft.

BRIEF DESCRIPTION OF THE DRAWINGS

Other advantages and features will become more clearly apparent from the following description of various illustrative embodiments of the invention, given as non-restrictive examples only and represented in the accompanying drawings, in which.

DESCRIPTION OF THE PREFERRED EMBODIMENT

Figure 1:
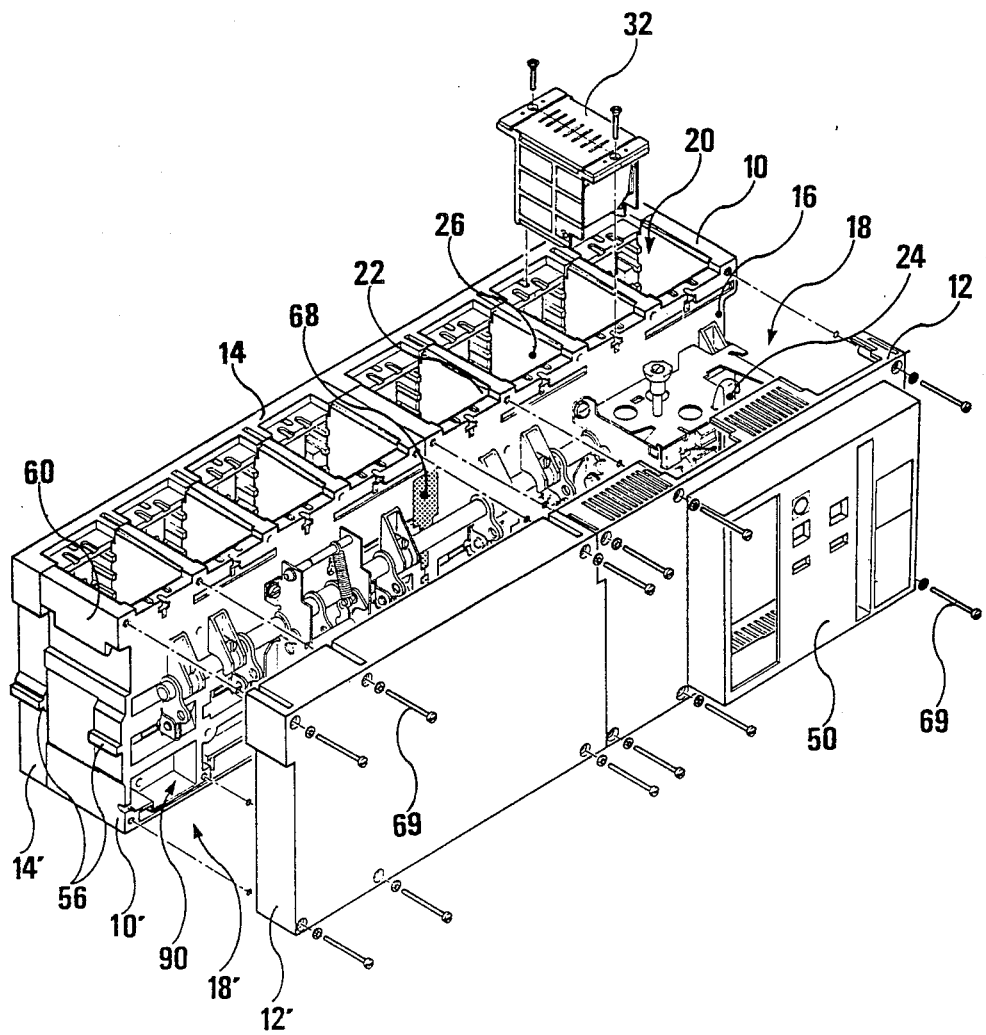
FIG. 1 is an exploded, perspective view of a circuit breaker according to the invention, in which a single arc chute is represented.

A low-voltage multipole circuit breaker, of a state-of-the-art type (right-hand part of FIG. 1), comprises a plurality of poles juxtaposed inside a molded case made of insulating material. The parallelipipedic case is formed by assembly of an intermediate case 10 (FIG. 2), a cover 12 and a rear case 14.

The front face 16 of the intermediate case 10 divides the case into a front compartment 18, bounded by this face and by the cover 12, and a rear compartment 20 designed to house the poles and electrically insulated from the front compartment.

The front compartment 18 houses an operating mechanism (not shown) acting on a transverse switching bar 22, common to all the poles. An operating mechanism setting lever 24, an electronic trip device (not shown) bringing about automatic tripping when a fault current occurs, and electrical measuring, signaling and monitoring auxiliaries (not shown) are also housed in the front compartment 18.

The rear compartment 20 is longitudinally subdivided into elementary compartments housing the poles by insulating partitions 26 separating the poles. Each pole of the rear compartment comprises a pair of separable contacts 28, 30 and a removable arc chute 32. The stationary contact 28 is directly supported by a first contact terminal pad 34 protruding slightly outwards from rear face of the rear case 14. The movable contact 30 is connected by a flexible conductor (braided) to a second contact terminal pad 38, also protruding outwards from the rear face of the rear case 14. A current transformer 40 is disposed around one of the contact terminal pads, in such a way as to supply the trip device with a measurement of the current flowing through the corresponding pole.

The internal arrangement and operation of a circuit breaker of this kind is well-known in the art and U.S. Pat. No. 4,764,650 should be advantageously referred to for a more detailed description.

A circuit breaker of this kind is preferably designed so as to be withdrawable, that is to say designed to be drawn into a fixed frame 42 having, on its rear face, two superposed rows of fixed connecting terminal pads 44 designed to be connected respectively to the two superposed rows of contact terminal pads 34, 38 by means of connecting grips 46 each formed by a plurality of juxtaposed elementary contact fingers 48. U.S. Pat. Nos. 4,686,334 and 4,743,715 respectively describe specific embodiments of connecting grips and of a draw-in and draw-out mechanism of a withdrawable circuit breaker of this type.

A range of state-of-the-art circuit breakers of this type comprises two standard, three and four-pole, molded case models, whose rating, from 800 A to 3200 A, is determined by the choice of the poles, that is to say essentially by the dimensions of the contact terminal pads 34, 38 securely fixed to the case, of the grips 46 and of the connecting terminal pads 44 securely fixed to the frame in the case of a withdrawable circuit breaker. The current transformers 40 also have a rating adapted to the circuit breaker rating.

The circuit breaker case according to the invention, represented in FIG. 1, is formed by adjoining two standard, three-pole or four-pole cases (10, 12, 14 and 10', 12', 14'), of a state-of-the-art type, the operating mechanism, electronic trip device and electrical auxiliaries, located in the front compartment 18 of one of the cases (10, 12, 14) being common to both the cases and the switching bar 22, controlled by the operating mechanism, being extended in the front compartment 18' of the other case (10', 12', 14'), in such a way as to be common to all the poles of the circuit breaker.

The cover 12' of the case which does not comprise the common control parts can be simplified with respect to the standard cover 12, which comprises a protruding part 50, as represented in FIG. 1. In this way, if the parts of the covers 12 and 12' which are not protruding are hidden by a door, mounted on the front face of the frame, schematically represented by 52 in FIG. 6, the front face of the circuit breaker according to the invention has, for the user, the same appearance as the front face of a standard circuit breaker.

The side walls of the intermediate case 10 and of the rear case 14 of a standard case comprise numerous reliefs and roughnesses. Indeed, this case is normally designed to be drawn into a fixed frame 42 by means of lateral support flanges 54, represented schematically in FIGS. 4 and 5, which move inside the frame. The side walls of the cases 10 and 14 comprise latching parts 56 designed to cooperate with positioning notches 58 provided in the upper part of the support flanges 54. Gripping edges 60, used notably to lift the case to place it on the support flanges 54, are also provided on the side walls of the intermediate case 10.

Figure 2:
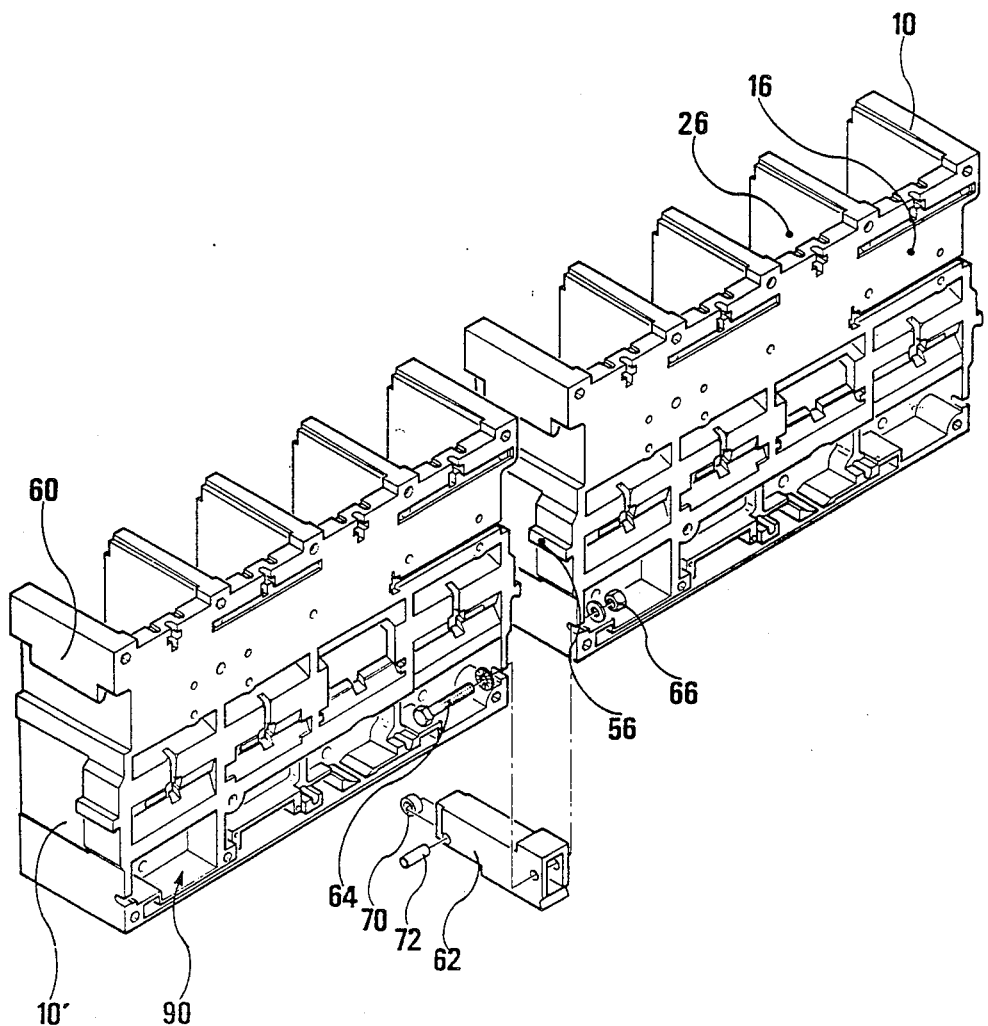
FIG. 2 is a perspective view of two standard intermediate cases designed to be adjoined.
Figure 3:
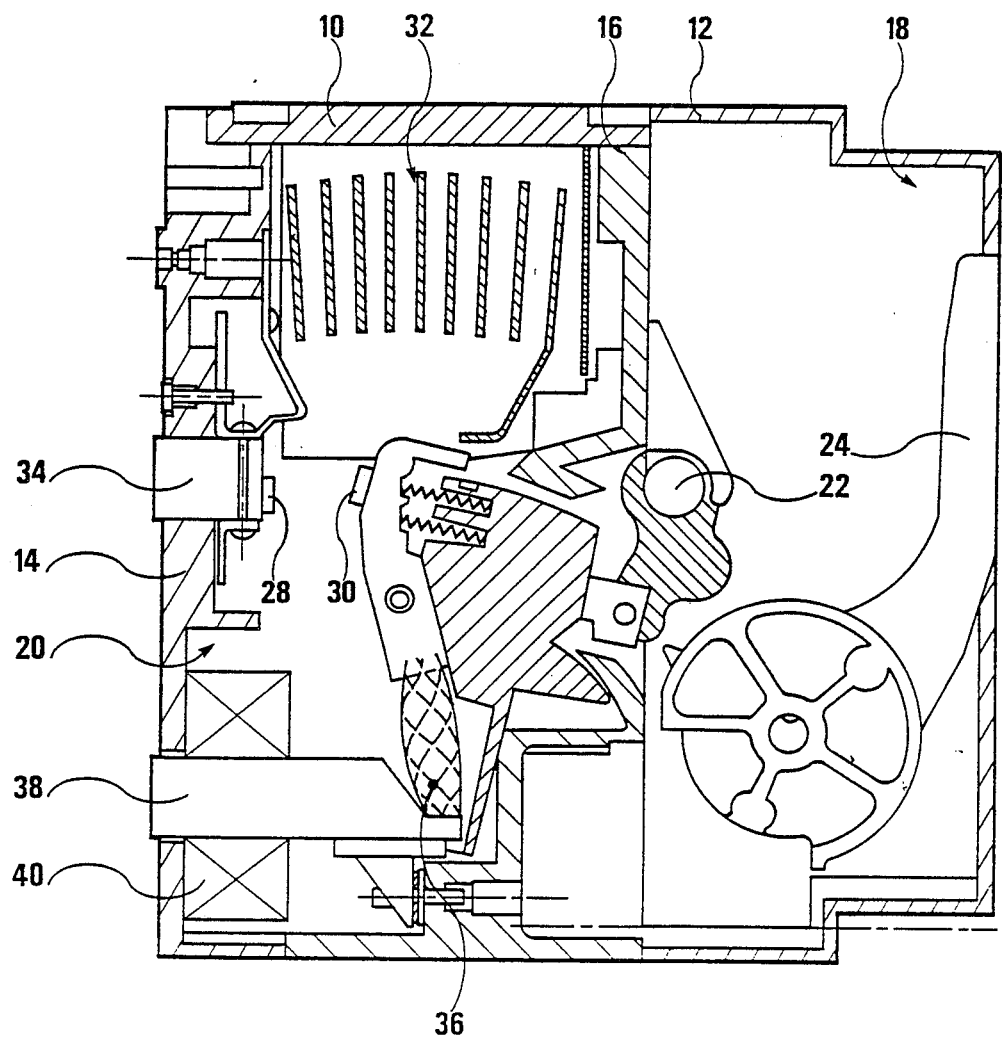
FIG. 3 is a longitudinal sectional view of a pole of the circuit breaker according to FIG. 1, represented in the open contacts position.
Figure 4:
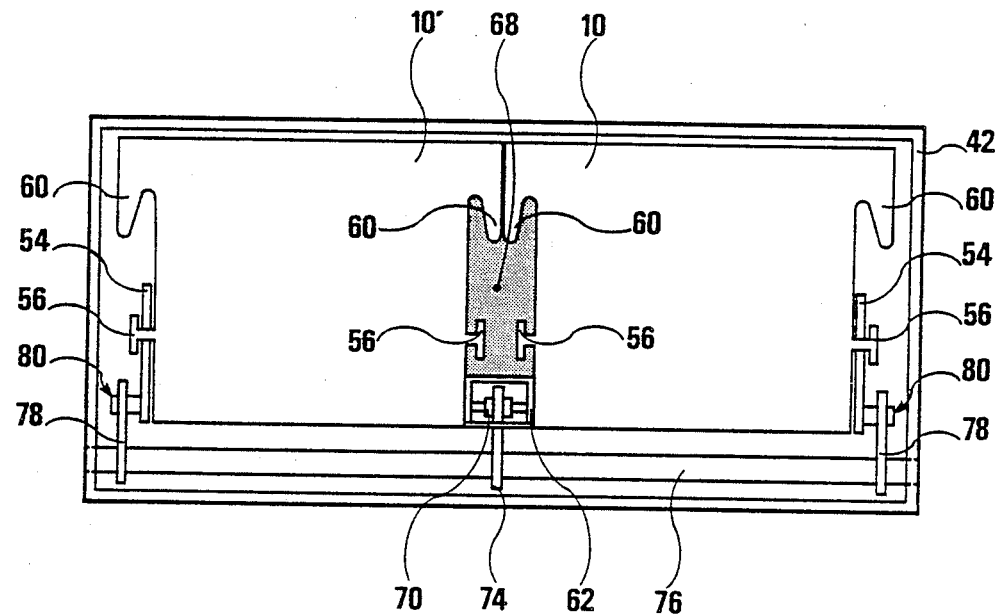
FIG. 4 is a schematic front view Of the rear compartment of the circuit breaker in the drawn-in position on a frame.

The presence of these reliefs and roughnesses is taken advantage of for fixing the two cases to one another. A spacer 62 is first of all fitted between the opposite side walls of the intermediate cases 10, 10', in the bottom part of the latter (FIGS. 2 and 4). The spacer is secured to these side walls by any suitable fixing means, for example by means of bolts 64 and nuts 66. The space between the cases 10 and 10' and templates provisionally fitted on either side of the front 16 and rear faces of the cases, is filled with cold-cast resin. The resin 68 then follows the exact shape of the opposite side walls of the cases. Thus, after the resin has hardened and the templates have been removed, the two cases 10 and 10' are solidly fixed to one another, the reliefs and roughnesses of the side walls providing good anchoring of the resin on these walls. The rear cases 14 and 14', and the covers 12 and 12', are then fixed to the adjoined cases by screws 69.

Figure 5:
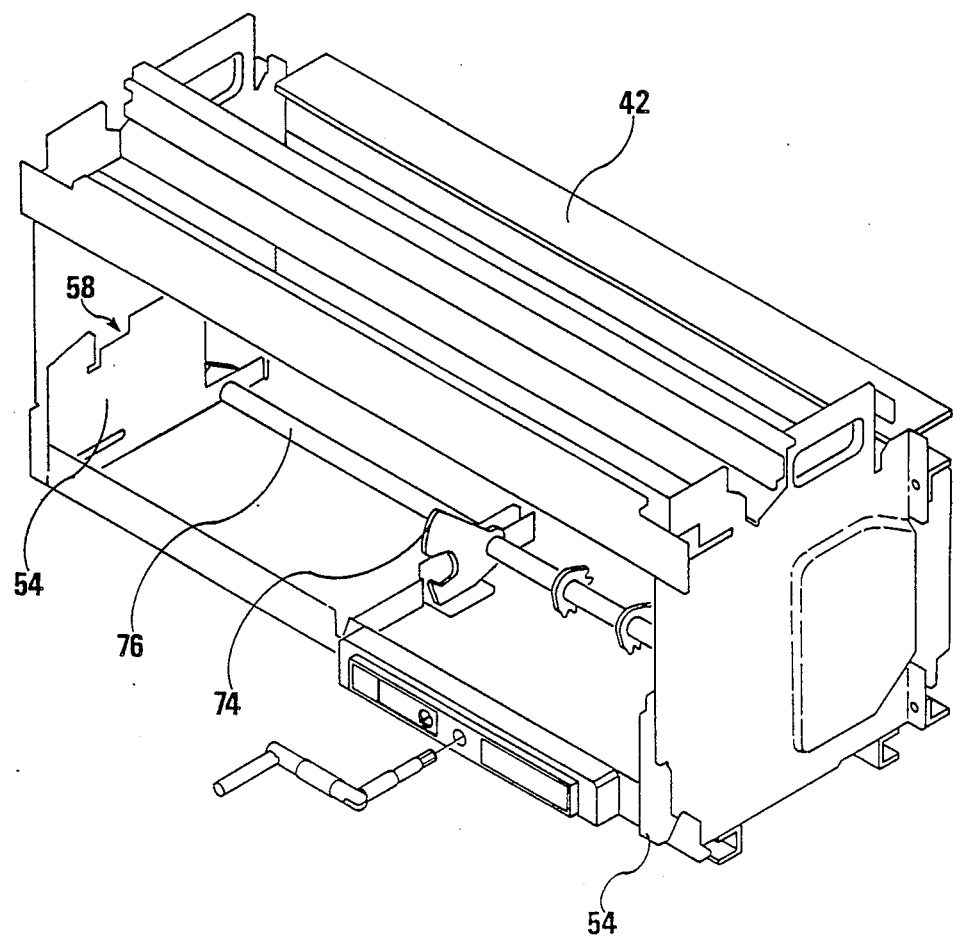
FIG. 5 represents, in perspective, a frame designed for drawing-in of a circuit breaker according to the invention.

The spacer 62 is shaped appreciably in the form of an open U at its bottom part, in which a roller 70 is fixed transversely by a spindle 72. The roller 70 is designed to cooperate with a rotating racking cam 74 fixed on a rotating shaft 76 disposed transversely in the frame 42 into which the circuit breaker case is designed to be drawn (FIGS. 4 and 5). The rotating shaft 76 is driven in rotation by any suitable device, for example by a racking device of the type described in the previously mentioned U.S. Pat. No. 4,743,715. As described in this patent, it comprises two lateral racking cams 78 which engage on coupling rollers 80 securely fixed to the support flanges 54.

The case according to the invention, when it is drawn into a frame 42, is therefore supported laterally, in a known manner, by the support flanges 54 comprising rollers 80 on which lateral racking cams 78 engage. In addition, it is held in its center part by the engagement of an additional center cam 74 which engages on the roller 70 of the spacer 62. The spacer thus fulfills a dual function of defining the clearance between the two standard cases and of driving the case when the case is drawn into a frame 42, due to a roller 70 securely fixed to the spacer operating in conjunction with a racking cam 74.

Figure 6:
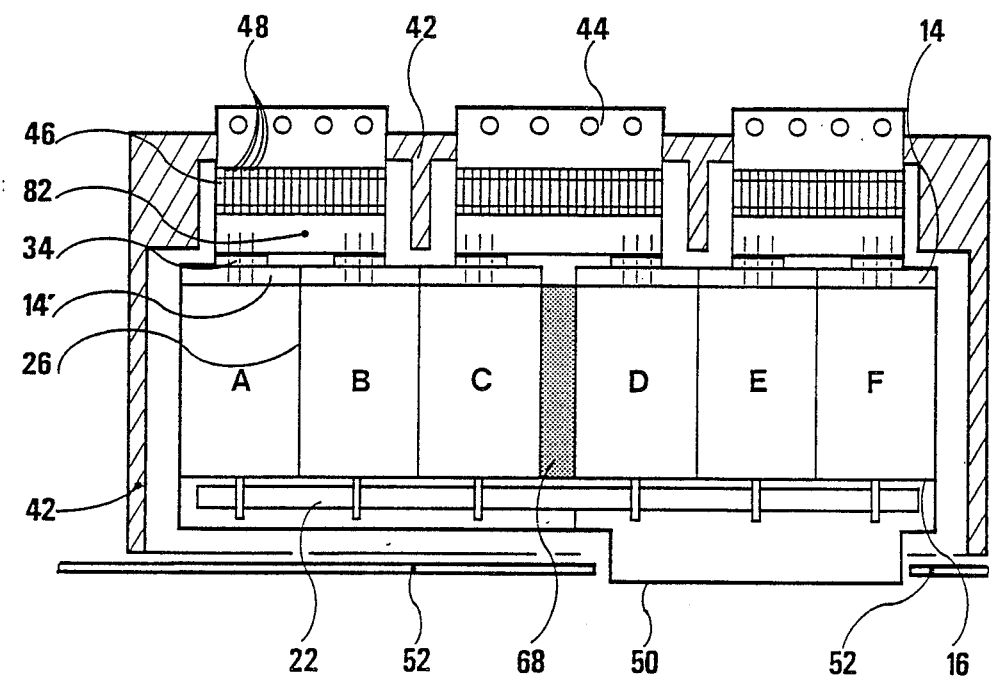
FIG. 6 is a schematic top view of an embodiment of a circuit breaker according to the invention, in the drawn-in position on a frame represented in cross-section.
Figure 7:
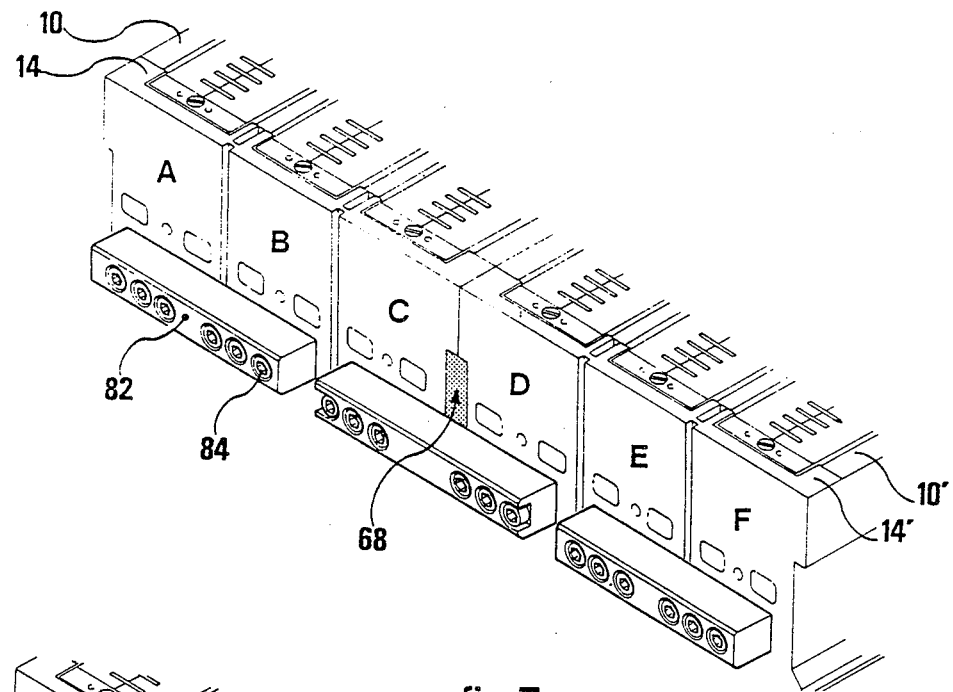
FIGS. 7, 8 and 10 represent, in rear perspective view, the upper part of three different embodiments of a circuit breaker according to the invention.

FIGS. 6 and 7 illustrate a circuit breaker made up of two adjoined three-phase cases. Such a case therefore comprises six elementary compartments housing standard individual poles A, B, C, D, E and F.

To form a three-pole circuit breaker, the poles are twinned two by two (A and B, C and D, E and F), that is to say electrically fitted in parallel, to form one of the poles of the circuit breaker. To achieve this, the contact terminal strips 34 or 38 respectively, of two adjacent twinned poles are fixed to a common connecting strip 82, designed to engage on a connecting grip 46, of the same width, itself connected to a fixed connecting terminal pad 44, also of the same width, when the circuit breaker is drawn into a frame 42.

Each contact terminal pad comprises tapped holes, only the axes of which are represented in FIG. 6, opening onto its rear face and facing orifices 84 passing through the associated strip so as to enable the strip to be fixed to the contact terminal pad by means of screws 86.

It should be noted that the center connecting strip 82 fitted to the poles C and D, that is to say connected to a pole of each of the standard cases, further strengthens the link between the two cases, at the rea of the latter.

To give a non-restrictive example, if each of the standard individual poles A, B, C, D, E and F has a rating of 3200 A, the three-pole circuit breaker represented in FIGS. 6 and 7 is a circuit breaker with a 5000 A rating.

Figure 8:
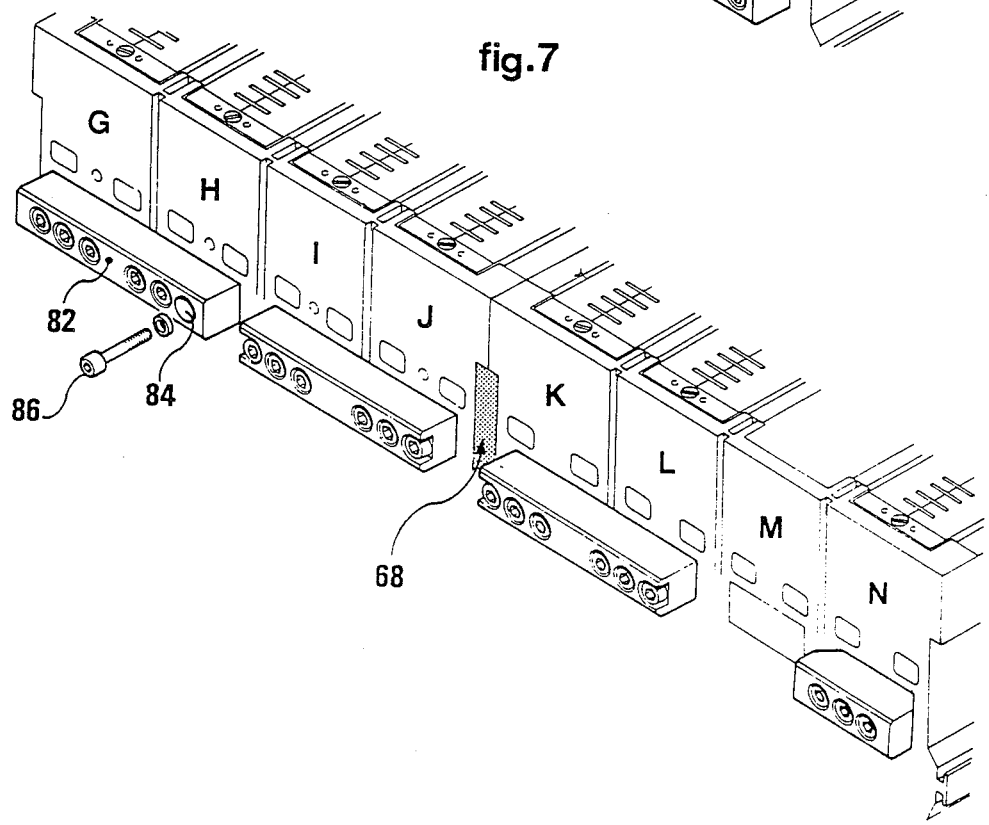

FIG. 8 illustrates a four-pole circuit breaker made up from two adjoined four-pole cases, that is to say from 8 elementary compartments G, H, I, J, K, L, M and N, designed to house standard individual poles. As in the embodiment in FIG. 7, each of the three mains phases is respectively associated with two adjacent twinned poles, G and H, I and J, K and L. As for the neutral, it is associated with one of the end poles N and separated from the other poles by an unused elementary compartment M. Each of the individual poles being designed for a rating of 3200 A, a four-pole circuit breaker with a 5000 A rating can thus be achieved. As the current normally flowing in the neutral is lower than that flowing in the other mains phases, it is not necessary to provide twinning of the poles for the neutral. However, for insulation purposes, it is preferable to separate the pole associated with the neutral from the other poles and to fit the unused elementary compartment M between them.

Figure 9:
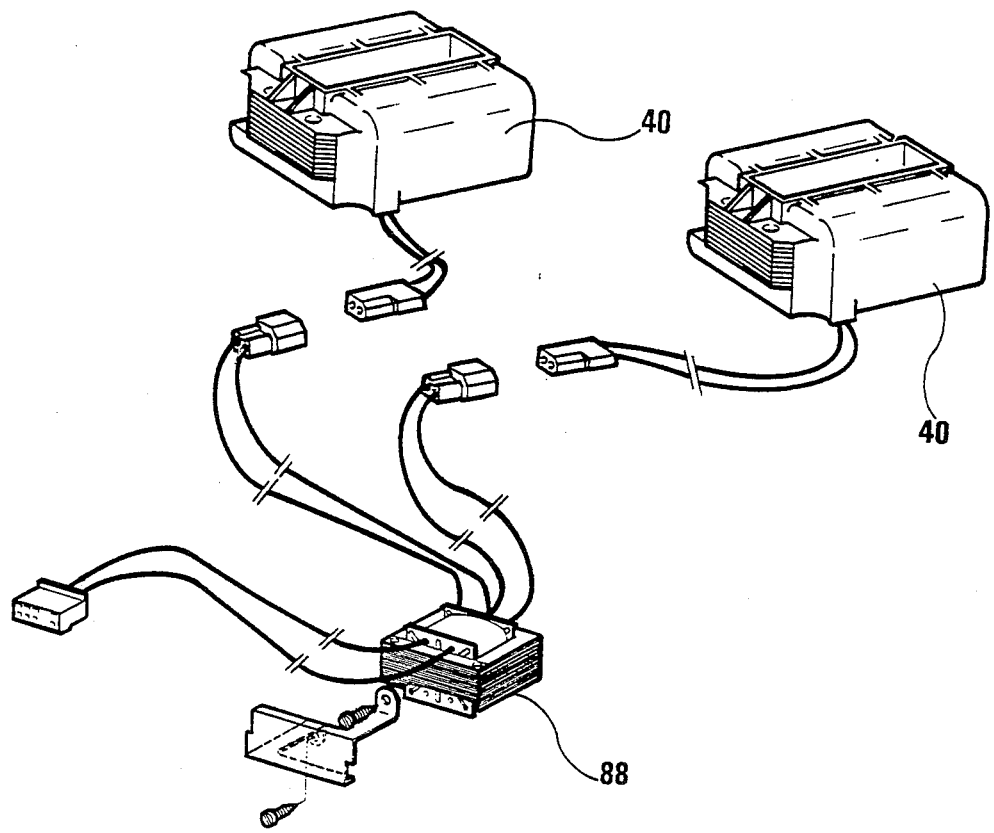
FIG. 9 illustrates a current sensor assembly used in a circuit breaker according to the invention.

Naturally, the current transformers 40 are also adapted to the circuit breaker rating. To give an example, for a three-pole circuit breaker with a rating of 5000 A, represented in FIGS. 6 and 7, the current transformers of two twinned poles are each designed for a rated current of 3200 A, a summing transformer 88 (FIG. 9) receiving the output signals from the two transformers and supplying the trip device with the sum of these signals.

In a preferred embodiment, a stepdown transformer is fitted between each of the current transformers and the trip device, the summing transformer 88 also acting as a stepdown unit for the two current transformers of twinned poles. Whereas the output signals from the current transformers 40 are in the order of 1A, the output signals from the stepdown transformers applied to the trip device are in the order of 100 mA. The stepdown transformers and the stepdown-summing transformer are preferably housed in the front compartment 18, in recesses 90 provided in the front face 16 of the intermediate case 10 (FIGS. 1 and 2).

Figure 10:
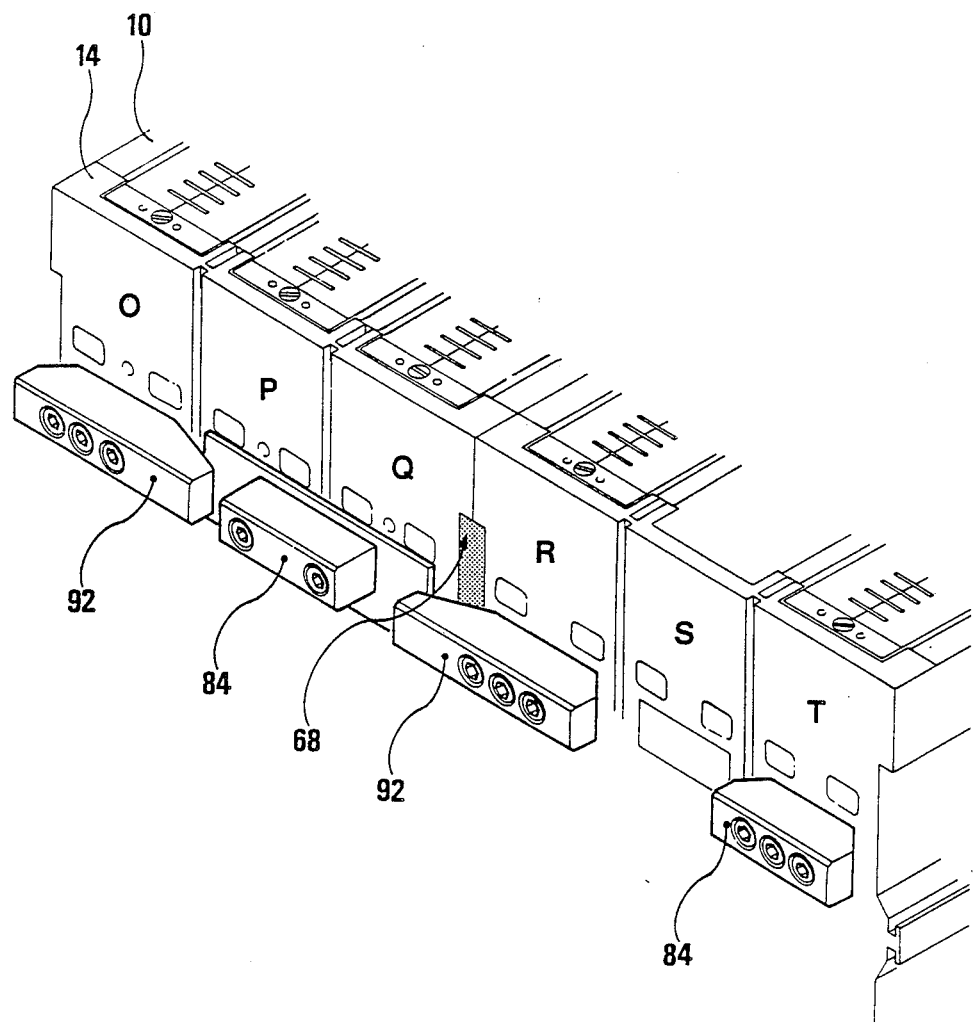

The present invention is in no way limited to a circuit breaker made up from two adjoined cases, in which each of the mains phases is associated with twinned poles. Adjoining two cases according to the invention can also be used to achieve a multipole circuit breaker, at least two adjacent poles of which are twinned, the connecting strips of the other poles being widened so as to overlap the immediately adjacent twinned pole, in such a way as to obtain a circuit breaker of higher rating than the individual poles that make it up. The French Patent application No. 8,717,446 filed on Dec. 10th 1987 describes several embodiments of circuit breakers of this kind, notably a four-pole circuit breaker of 4000 A rating made up from two adjoined three-pole cases comprising six juxtaposed elementary compartments (O, P, Q, R, S, T) designed to house five standard individual poles designed for a rating of 3200 A and in which two center poles (P, Q) are twinned, two other poles (O, R), associated with the two other mains phases comprising widened connecting strips 92, the neutral pole (T) being separated from the other poles by an unused elementary compartment (S) (FIG. 10). Similarly, by adjoining two four-pole cases each of the individual poles of which is designed for a 3200 A rating, it is possible to achieve a three-pole circuit breaker with an 8000 A rating (not represented). To accomplish this, two adjacent lateral poles are twinned and comprise a widened connecting strip, that is to say whose width is greater than the width of the two twinned poles. The same is the case for the two opposite adjacent lateral poles. Three of the center poles are connected in parallel, the elementary compartment remaining unused. The rating of this circuit breaker is then higher than the rating of two parallel-mounted standard poles.

We claim:

1. A low-voltage multipole circuit breaker, for high current intensities, comprising a plurality of poles juxtaposed inside an insulating molded case whose side walls comprise reliefs, each pole comprising a pair of separable contacts, an arc chute and a pair of contact terminal pads connected to the separable contacts and protruding outwards from the case, the contact terminal pads being connected to connecting strips designed to be connected respectively to the phases of a mains system to be protected, a circuit breaker characterized in that it is formed by two adjoined standard multipole cases, comprising in common an operating bar of the poles, an operating mechanism of said bar, and an electronic trip device actuating said mechanism, a spacer being fixed to the opposite side walls of the two cases, resin cold-cast between said opposite side walls providing fixing of the two cases, and at least one of the connecting strips being connected to at least two adjacent twinned poles, electrically arranged in parallel.

2. The circuit breaker according to claim 1, wherein each standard case is formed by assembly of an intermediate case, a rear case and a cover, the front face of the intermediate case dividing the case into a front compartment bounded by said face and the cover, and a rear compartment designed to house the poles, and the spacer is fixed to the bottom part of the opposite side walls of the intermediate cases of the two standard cases to be adjoined, the resin filling the space remaining between the two intermediate cases, the common electronic trip device and bar operating mechanism being housed in the front compartment of one of the standard cases.

3. The circuit breaker according to claim 1, wherein the spacer is fixed by bolts to said side walls.

4. The circuit breaker according to claim 1, wherein, the circuit breaker being of the draw-in type in a fixed frame comprising a rotating shaft securedly united to at least two lateral racking cams designed to drive the circuit breaker in the course of racking-in, the spacer comprises a roller designed to cooperate, when the circuit breaker is drawn into the frame, with a central racking cam securedly fixed to said shaft.

5. The circuit breaker according to claim 1, wherein each of the connecting strips designed to be connected to a phase of the mains system is connected to two associated twinned poles.

* * * * *